(12) United States Patent  (10) Patent No.: US 8,232,803 B2
Bloemenkamp  (45) Date of Patent: Jul. 31, 2012

(54) TOOL FOR ELECTRICAL INVESTIGATION OF A BOREHOLE

(75) Inventor: Richard Bloemenkamp, Le Plessis-Robinson (FR)

(73) Assignee: Schlumberger Technology Corporation, Sugar Land, TX (US)

(*) Notice: Subject to any disclaimer, the term of this patent is extended or adjusted under 35 U.S.C. 154(b) by 529 days.

(21) Appl. No.: 12/518,402

(22) PCT Filed: Dec. 10, 2007

(86) PCT No.: PCT/EP2007/010794
§ 371 (c)(1),
(2), (4) Date: Jun. 9, 2009

(87) PCT Pub. No.: WO2008/077477
PCT Pub. Date: Jul. 3, 2008

(65) Prior Publication Data
US 2010/0013487 A1  Jan. 21, 2010

(30) Foreign Application Priority Data
Dec. 22, 2006  (EP) .................... 06292050

(51) Int. Cl.
*G01V 3/02*  (2006.01)

(52) U.S. Cl. .................. 324/367; 324/358; 324/370
(58) Field of Classification Search .............. 324/358, 324/367, 370
See application file for complete search history.

(56) References Cited

U.S. PATENT DOCUMENTS

| 7,265,553 B2* | 9/2007 | Cheung et al. ............. 324/367 |
| 2005/0134280 A1* | 6/2005 | Bittar et al. ............. 324/367 |

* cited by examiner

*Primary Examiner* — Bot Ledynh
(74) *Attorney, Agent, or Firm* — Stephanie Chi; Mathias Abrell; Darla Fonseca

(57) ABSTRACT

A tool 1 is used in electrical investigation of geological formations GF surrounding a borehole BH. The tool 1 is comprised in a string of tools TS. The tool 1 comprises a current injection section CIS and a current return section CRS. The string of tools TS comprises at least one other section OS1. The current injection section CIS is electrically decoupled from the current return section CRS. The current injection section CIS is electrically decoupled from the at least one other section OS1 when the current injection section CIS and the at least one other section OS1 are adjacent to each other. The current return section CRS is electrically decoupled from the at least one other section OS1 when the current return section CRS and the at least one other section OS1 are adjacent to each other.

20 Claims, 12 Drawing Sheets

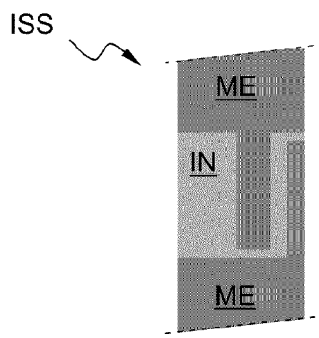
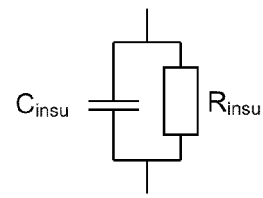
FIG. 7A  FIG. 7B
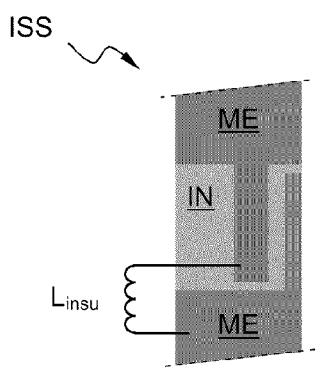
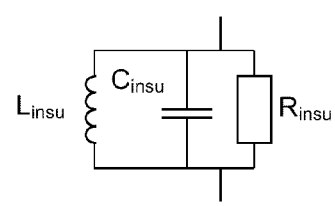
FIG. 8A  FIG. 8B
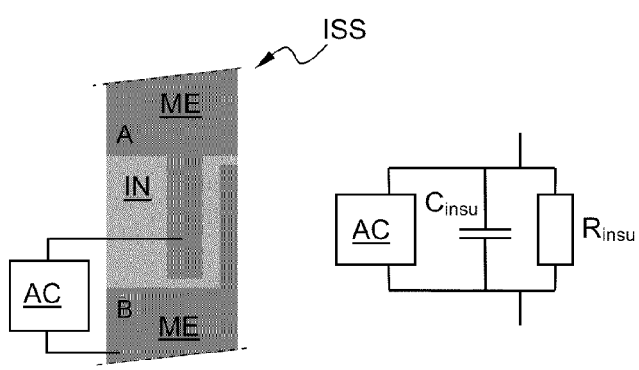
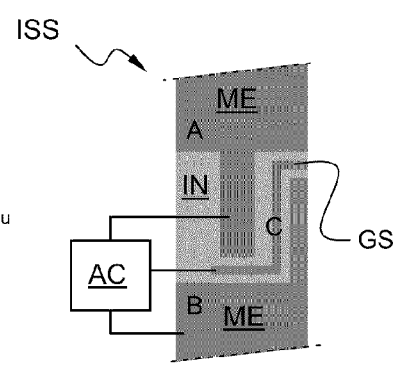
FIG. 9A  FIG. 9B  FIG. 10

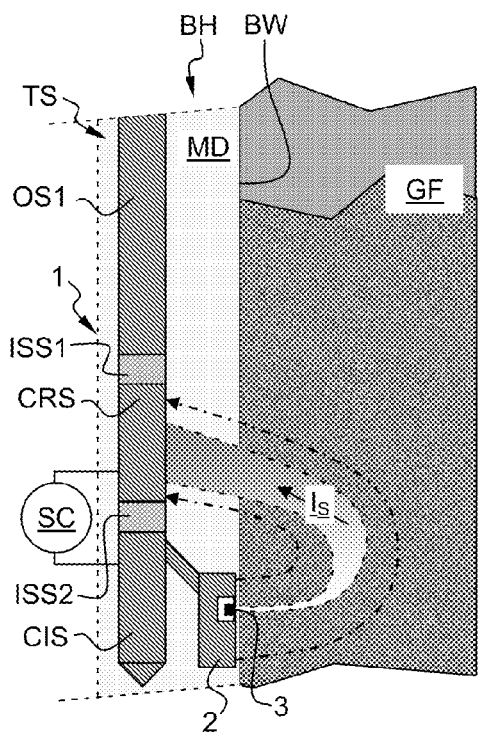
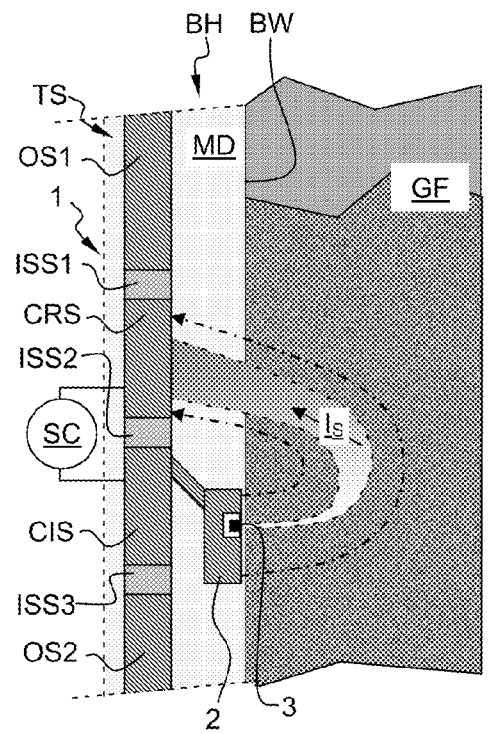
FIG. 11　　　　　FIG. 12
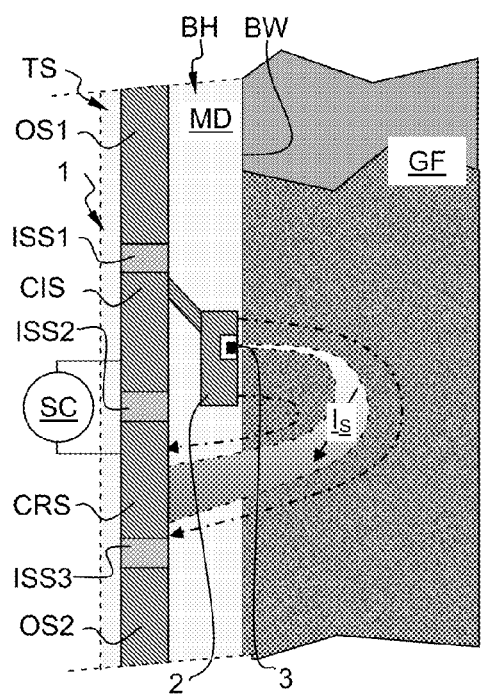
FIG. 13

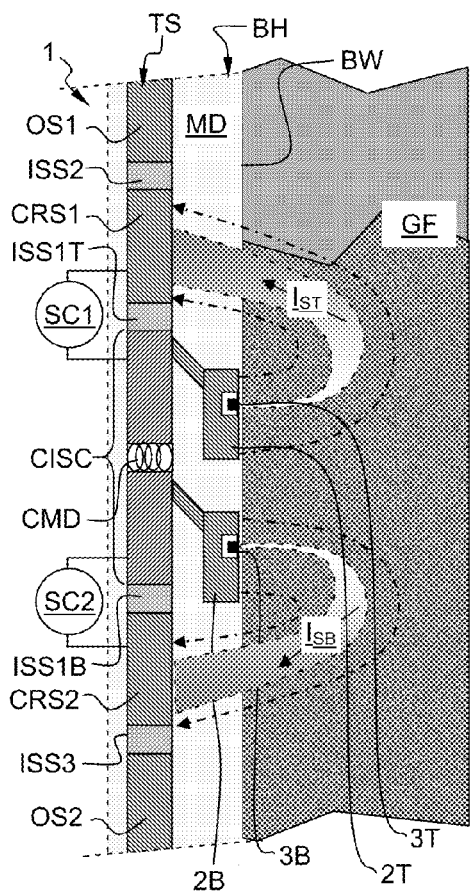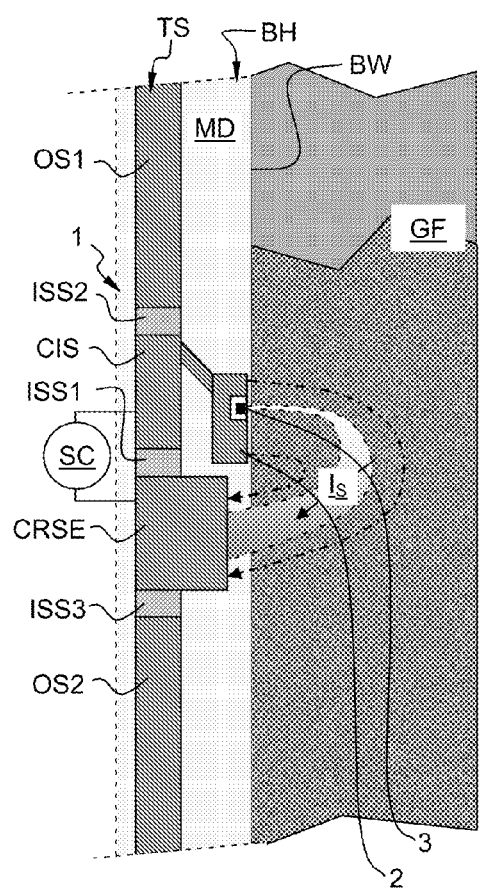
FIG. 16  FIG. 17

TOOL FOR ELECTRICAL INVESTIGATION OF A BOREHOLE

FIELD OF THE INVENTION

The invention relates to a tool used for the electrical investigation of a borehole penetrating geological formations. The tool which is run along the borehole enables micro-electric images of the borehole wall by injecting and measuring survey currents injected into the geological formations. The invention finds a particular application in the oilfield industry.

BACKGROUND OF THE INVENTION

Tools are known, for example from U.S. Pat. Nos. 4,468,623, 6,600,321, 6,714,014 or 6,809,521 using current injection measurements in order to obtain micro-electric images of a borehole wall, the borehole penetrating geological formations.

FIG. 1A is a partial cross-section view in a borehole BH showing a part of a typical high-frequency current injection tool TL according to the hereinbefore mentioned prior art. The tool TL is comprised in a string of tool TS. The tool TL comprises a current injection section CIS and a current return section CRS. The current injection section CIS is isolated from the current return section CRS by an isolation section ISS. The current injection section CIS comprises a pad P carrying electrodes for injecting a survey current $I_S$ into the geological formations when the pad P1 contacts the borehole wall BW. A current source or voltage source SC is connected between the current injection section and the current return section such that the current injection section CIS is driven at a voltage $V=V_0(t)$ with respect to the current return section CRS. Generally, the current source or the voltage source is not an ideal source and is positioned in a middle location between the current injection section and the current return section. The electrode(s) is (are) held at approximately the same electric potential (voltage) as the current injection section. The survey current $I_S$ is a three dimension current tube connecting the electrode and a portion of the current return section.

When the borehole is filled with a conductive mud, e.g. a water-base mud, such tools normally operate at low frequencies, e.g. below 20 kHz. In conductive mud, the interpretation of the measured current is easily related to the local resistivity of the borehole wall.

When the borehole is filled with a non-conductive/resistive mud, e.g. an oil-base mud, such tools operate at high frequencies, e.g. above around 100 kHz. FIGS. 1B and 1C schematically show approximate equivalent circuit models in such a case. In non-conductive/resistive mud the survey current $I_S$ is controlled by the impedance of the mud $Z_{MD}$, the impedance of the formation $Z_{GF}$ and the impedance of the current return $Z_{CR}$, combined in series. The impedance of the mud $Z_{MD}$ is the impedance between the current injection section CIS (more precisely point A) and the geological formation GF (more precisely point B). The impedance of the mud $Z_{MD}$ is defined as $Z_{MD}=V_{AB}/I_S$, where $V_{AB}$ is the complex voltage between points A and B and $I_S$ is a complex quantity. The impedance of the formation $Z_{GF}$ is defined by the impedance between point B and point C. The impedance of the formation $Z_{GF}$ is defined as $Z_{GF}=V_{BC}/I_S$, where $V_{BC}$ is the complex voltage between points B and C. The impedance of the current return $Z_{CR}$ is the impedance between the geological formation GF (more precisely point C) and the current return section CRS (more precisely point D). The impedance of the current return $Z_{CR}$ is defined as $Z_{CR}=V_{CD}/I_S$, where $V_{CD}$ is the complex voltage between points C and D. The tools of the prior art as hereinbefore mentioned use as a current return the whole string of tools above the insulation section over which a voltage drop is applied (from $V=V_0$ to $V=0$). If the mud impedance $Z_{MD}$ is significantly greater than the formation impedance $Z_{GF}$ then the measurement is insensitive to the formation impedance $Z_{GF}$. In this case a higher frequency is needed to reduce the mud impedance $Z_{MD}$, by the capacitive effect, so that the formation impedance $Z_{GF}$ can be measured. However, it is observed that the impedance of the current return $Z_{CR}$ at high frequency still affects the current measurement.

At high frequencies, the wavelength is short and becomes comparable to or smaller than the tool string length. Typically, the tool string being conductive, the mud around being resistive and the geological formations being conductive, they define a coaxial wave-guide/cable with the tool string as the inner conductor and the formation as the outer conductor. From transmission-line theory, it is known that the complex impedance of the coaxial wave-guide/cable at the input depends highly on the length of the coaxial wave-guide/cable. Generally, the impedance of the current return $Z_{CR}$ may be approximated by various capacitances C0, C1, C2, etc. ... and inductances L1, L2, L3, etc. ... combined in parallel depending on the locations at which the string of tools TS touches or at least has a good electrical contact with the borehole wall BW. In the approximate equivalent circuit model of FIG. 1C, a good electrical contact at positions P1 and P2 is represented by a switch S1, S2 associated with the respective capacitance that is closed. In the example of FIG. 1C, none, one or both switches S1, S2 may be closed. It is difficult to determine the exact position where the string of tools touches the borehole wall or has the best electrical contact to the geological formations. Consequently, at high frequency, with a borehole filled with a non-conductive/resistive mud surrounded by a lower resistance geological formation, the impedance of the current return $Z_{CR}$ may vary strongly when the tool measures survey currents $I_S$, thus significantly influencing these measurements. Therefore, the tools according to the hereinbefore mentioned prior art may have an insufficient accuracy.

SUMMARY OF THE INVENTION

It is an object of the invention to propose a tool for the electrical investigation of geological formations surrounding a borehole that overcomes at least one of the drawbacks of the prior art tool.

The invention relates to a tool is used in electrical investigation of geological formations surrounding a borehole. The tool is comprised in a string of tools. The tool comprises a current injection section and a current return section. The string of tools comprises at least one other section.

The current injection section is electrically decoupled from the current return section. The current injection section is electrically decoupled from the at least one other section when the current injection section and the at least one other section are adjacent to each other.

The current return section is electrically decoupled from the at least one other section when the current return section and the at least one other section are adjacent to each other.

The current injection section injects current into the geological formations surrounding the borehole at a frequency above around 100 kHz.

A current or voltage source is connected between the current injection and the current return section.

The current injection section comprises at least one pad for contacting a wall of the borehole, the pad carrying at least one electrode for injecting current into the geological formations.

The tool may further comprise a supporting section for supporting the pad, the pad constituting the current injection section and being isolated from the supporting section.

The current return section may be an extended current section radially protruding towards the wall of the borehole relatively to the other sections.

The current return section may comprise an extendable element able to be extended towards the wall of the borehole. The tool may further comprise a supporting section for supporting the extendable element, the extendable element constituting the current return section and being isolated from the supporting section.

The current return section may comprise at least one pad for contacting a wall of the borehole, the pad carrying at least one electrode for sensing currents.

The current injection section may comprise a first pad and a second pad, the first pad being associated with a first current return section, the second pad being associated with a second current return section. The current injection section may further comprise a current measurement device for measuring the current flowing in the current injection section between the two pads.

Further, the tool may comprise a supporting section supporting an extended pad. The extended pad may comprise a first part constituting the current injection section and a second part constituting the current return section, the first part being isolated from the second part and from the supporting section.

The first part may be isolated from the supporting section by means of an arm of the extended pad.

Furthermore, the tool may comprise a supporting section supporting an extended pad. The extended pad may comprise a middle part constituting the current injection section, a bottom part constituting a first current return section and a top part constituting a second current return section, the top part being positioned above the middle part and the bottom part being positioned below the middle part, the middle, top and bottom parts being isolated from each other and from the supporting section.

The middle part may be isolated from the supporting section by means of an arm of the extended pad.

The sections are electrically decoupled from each other by an isolation section. The isolation section comprises an insulator.

The isolation section may comprise an insulator and a capacitive coupling compensation circuit coupled in parallel to the insulator.

The capacitive coupling compensation circuit may be an inductance.

The capacitive coupling compensation circuit may be an active circuit.

At least one conductive screen may be further at least partially embedded into the insulator without contacting the adjacent section. The active circuit may be further connected to the at least one screen.

With the invention, it is not necessary anymore to use the whole tool string above the high-frequency current injection tool as a current return but only a section of the tool string. The current return section has a limited length, for example smaller than 10 meters. Advantageously, the return can be positioned above or below the current injection section and can be adapted to have a better coupling to the geological formation. The tool of the invention enables obtaining survey current measurements of better quality, thus geological formation resistivity measurements of better accuracy.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements:

FIGS. 7A and 7B schematically illustrate a first embodiment of the isolation section according to the invention, and a corresponding approximate equivalent circuit model, respectively;

FIGS. 8A and 8B schematically illustrate a second embodiment of the isolation section according to the invention, and a corresponding approximate equivalent circuit model, respectively;

FIGS. 9A and 9B schematically illustrate a third embodiment of the isolation section according to the invention, and a corresponding approximate equivalent circuit model, respectively;

FIG. 10 schematically shows a fourth embodiment of the isolation section according to the invention; and FIGS. 11-25 are partial cross-section views in a borehole showing a part of a high-frequency current injection tool according to a first, a second, a third, a fourth, a fifth, a sixth, a seventh, a eighth, a ninth, a tenth, a eleventh, a twelve, a thirteen, a fourteen and a fifteen embodiment of the invention, respectively.

DETAILED DESCRIPTION OF THE INVENTION

In the following description, by convention a "top" element refers to an element positioned closer to the surface than a "bottom" element in a vertical borehole, i.e. a "top" element is above a "bottom" element. However, those versed in the art would easily adapt this terminology to inclined borehole or horizontal borehole.

Figure 1A:
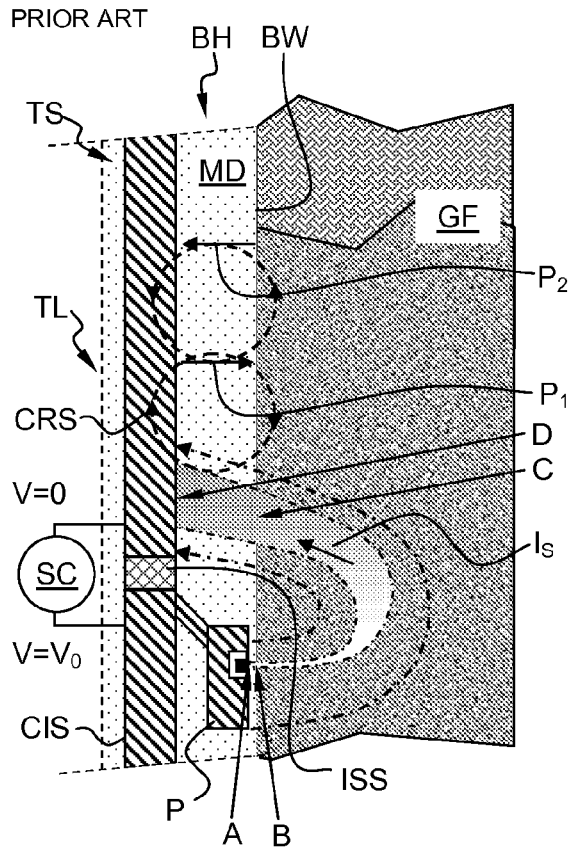
FIG. 1A is a partial cross-section view in a borehole showing a part of a typical high-frequency current injection tool of the prior art.
Figure 1C:
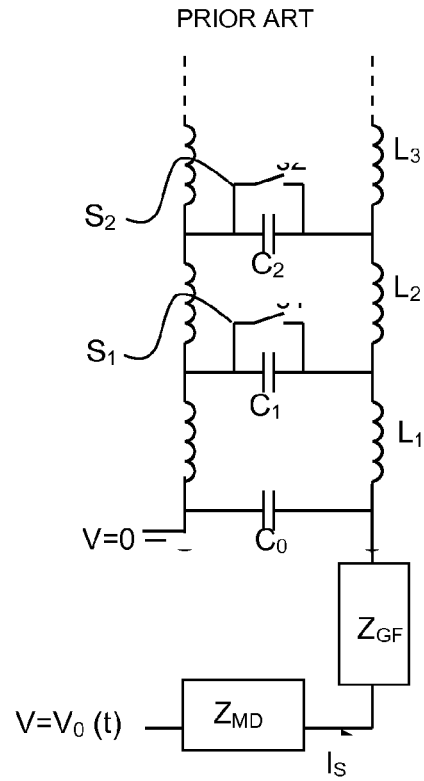
FIGS. 1B and 1C schematically show approximate equivalent circuit models corresponding to FIG. 1A.
Figure 1B:
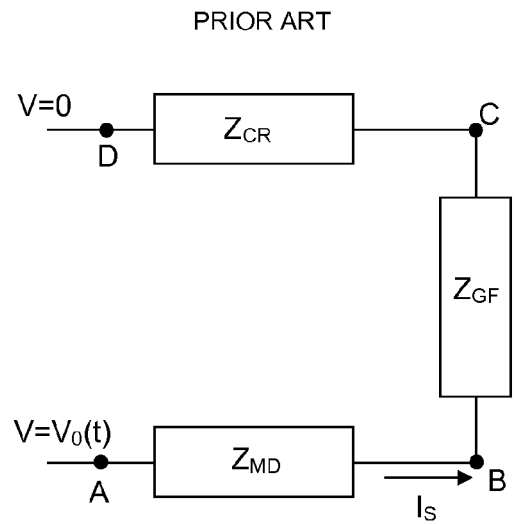
Figure 2:
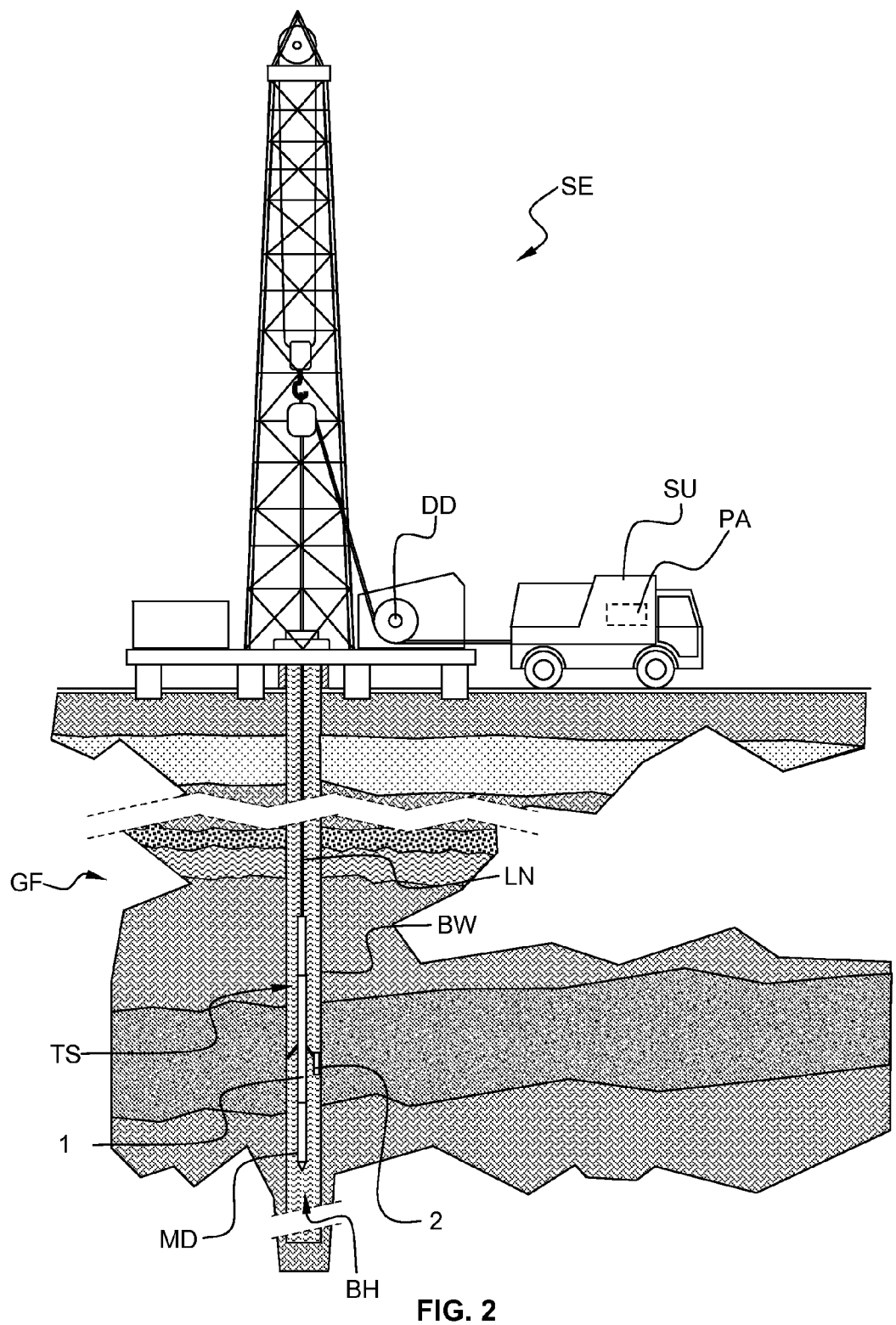
FIG. 2 schematically illustrates a typical onshore hydrocarbon well location.

FIG. 2 schematically shows a typical onshore hydrocarbon well location and surface equipments SE above a hydrocarbon geological formation GF after drilling operations have been carried out. At this stage, i.e. before a casing string is run and before cementing operations are carried out, the wellbore is a borehole BH filled with a fluid mixture MD. The fluid mixture MD is typically a drilling mud. In this example, the surface equipments SE comprise an oil rig and a surface unit SU for deploying a logging tool 1 in the well-bore. The surface unit may be a vehicle coupled to the logging tool by a line LN. Further, the surface unit comprises an appropriate device DD for determining the depth position of the logging tool relatively to the surface level. The logging tool 1 comprises various sensors and provides various measurement data related to the hydrocarbon geological formation GF and/or the fluid mixture DM. These measurement data are collected by the logging tool 1 and transmitted to the surface unit SU. The surface unit SU comprises appropriate electronic and software arrangements PA for processing, analyzing and storing the measurement data provided by the logging tool 1.

The logging tool 1 comprises a high-frequency current injection tool provided with at least one pad 2 for investigating the electric properties of a subsurface geological formation GF according to the invention. Once the logging tool is positioned at a desired depth, the pad 2 can be deployed from the logging tool 1 against the borehole wall BW by any appropriate deploying arrangement that is well known in the art so that it will not be further described.

Figure 3A:
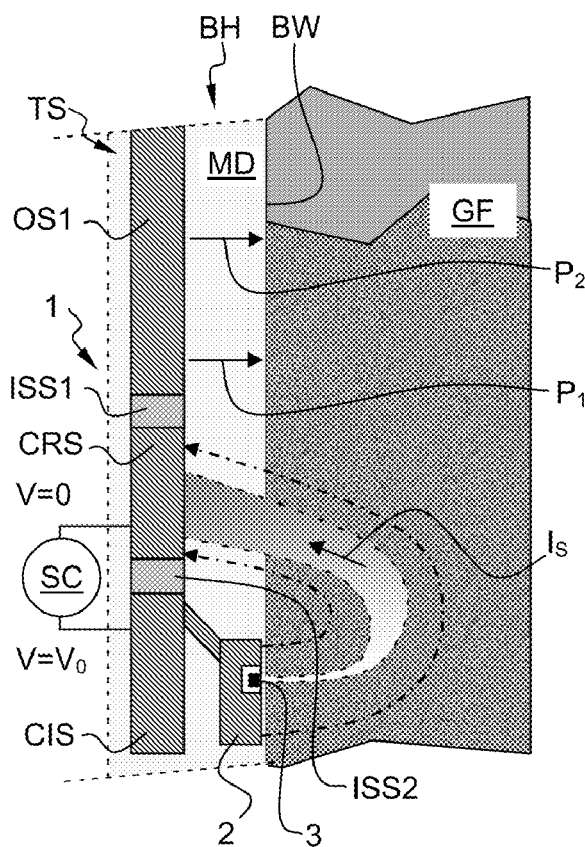
FIG. 3A is a partial cross-section view in a borehole showing a part of a high-frequency current injection tool according to the invention.

FIG. 3A is a partial cross-section view in a borehole BH showing a part of a high-frequency current injection tool according to the invention, used in electrical investigation of geological formations GF surrounding a borehole BH. The tool operates at a frequency above around 100 kHz.

The tool 1 is comprised in a string of tools TS. The string of tools comprises a current injection section CIS, a current return section CRS and at least one other section OS1.

In the particular example of FIG. 3A, the other section OS1 is positioned adjacent to the current return section CRS, more precisely on the top of the current return section CRS. Additionally, the current return section CRS is positioned adjacent to the current injection section CIS, more precisely on the top of the current injection section CIS.

The current injection section CIS is electrically decoupled from the current return section CRS by means of a first isolation section ISS1. The current return section CRS is electrically decoupled from the other section OS1 by means of a second isolation section ISS2.

A current or voltage source SC is connected between the current injection section CIS and the current return section CRS. The current injection section CIS is driven at a voltage $V=V_0(t)$ with respect to the current return section CRS.

The current injection section comprises a pad 2 that is deployed by means of arm such that the pad 2 contacts the wall BW of the borehole BH. The pad 2 carries an electrode 3 for injecting a survey current $I_S$ into the geological formations GF.

Figure 3B:
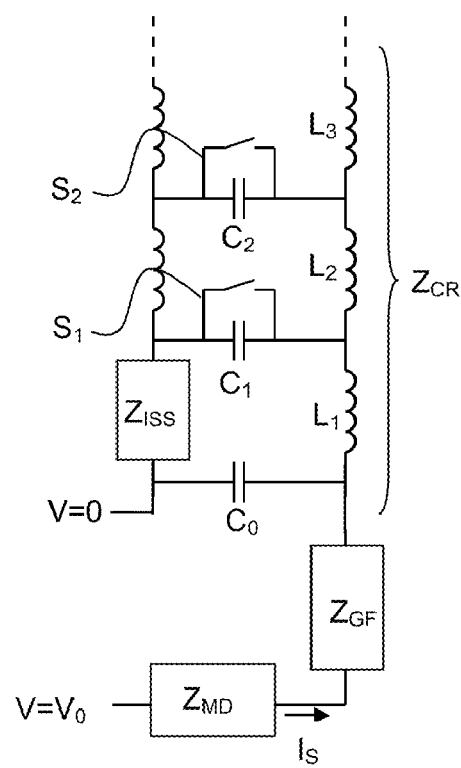
FIG. 3B schematically shows approximate equivalent circuit model corresponding to FIG. 3A.

FIG. 3B schematically shows the approximate equivalent circuit model corresponding to the tool of FIG. 3A. The survey current $I_S$ is controlled by the impedance of the mud $Z_{MD}$, the impedance of the formation $Z_{GF}$ and the impedance of the current return $Z_{CR}$, combined in series. The impedance of the mud $Z_{MD}$ is the impedance between the current injection section CIS and the geological formation GF. The impedance of the current return $Z_{CR}$ is the impedance between the geological formation GF and the current return section CRS. Generally, the impedance of the current return $Z_{CR}$ may be approximated by various capacitances C0, C1, C2, etc. . . . and inductances L1, L2, L3, etc. . . . combined in parallel depending on the locations at which the tool string TS touches or at least has a good electrical contact with the borehole wall BW. In the approximate equivalent circuit model of FIG. 3B, a good electrical contact at positions P1 and P2 is represented by a switch S1, S2 associated with the respective capacitance that is closed. In the example of FIG. 3B, none, one or both switches S1, S2 may be closed. However, when the impedance $Z_{ISS}$ of the second isolation section ISS2 is large typically greater than or equal to 200Ω at a frequency around 1 MHz decreasing to a value greater than or equal to 50Ω at a frequency around 10 MHz, then the impedance of the current return $Z_{CR}$ is substantially equal to $C_0$. Thus, the circuit above the second isolation section ISS2 has not any, or at least a very limited influence on the survey current $I_S$.

To the first order, the survey current IS may be modeled with the formula:

$$I_S = \frac{V}{Z_{MD} + Z_{GF} + Z_{CR}}$$

where V is the potential difference, which injects current into the formation.

The measurement aims at obtaining an image of the spatial variations in the formation resistivity $\rho_{GF}$ which is linearly related to the resistance $R_{GF}$. The resistance $R_{GF}$ is the real part of the impedance $Z_{GF}$ from the measurement of the survey current $I_S$. It is to be noted that the difference made hereinbefore between the formation resistivity $\rho_{GF}$ and resistance $R_{GF}$ is often neglected.

Figure 4:
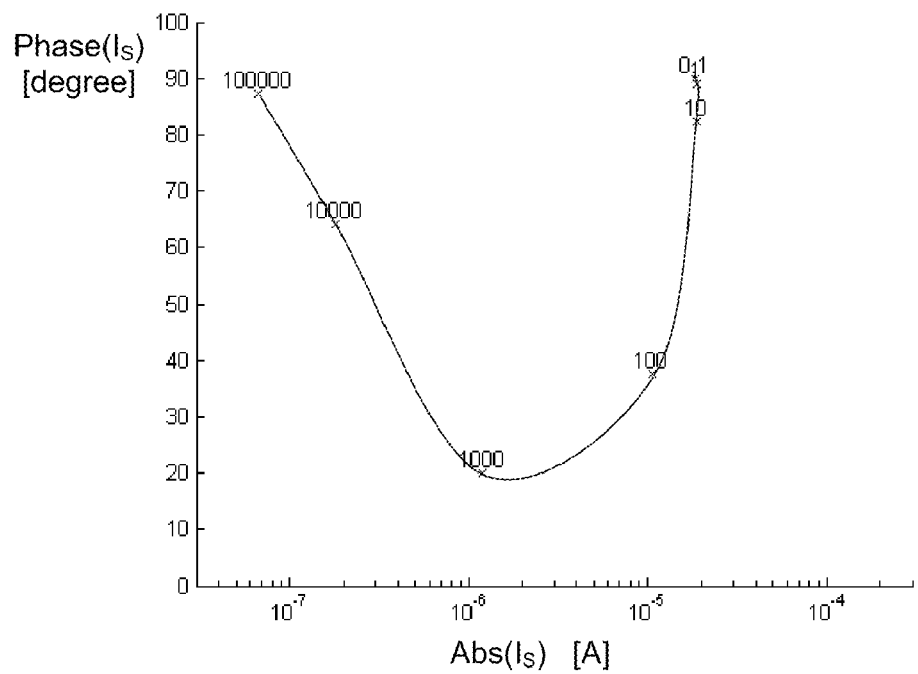
FIG. 4 is a graphic representing the amplitude and phase of the survey current for various resistivities of geological formations.

FIG. 4 is a graphic representing the amplitude and phase of the survey current $I_S$ for various resistivities of geological formations and for resistive mud filling the borehole. Typically, the survey current $I_S$ as a function of the formation resistivity $\rho_{GF}$ follows curves similar to the one of FIG. 4. The curve of FIG. 4 is an ideal curve showing various formation resistivity $\rho_{GF}$ of 0.1 Ω·m, 10 Ω·m, 100 Ω·m, 1 kΩ·m, 10 kΩ·m and 100 kΩ·m, for a current return section that is infinitely long and centered in the borehole. Such a curve slightly changes in real situations in which the tool string has a good electrical connection to the borehole wall at determined heights in the borehole. The curves of FIGS. 5 and 6 depict these situations.

Figure 5:
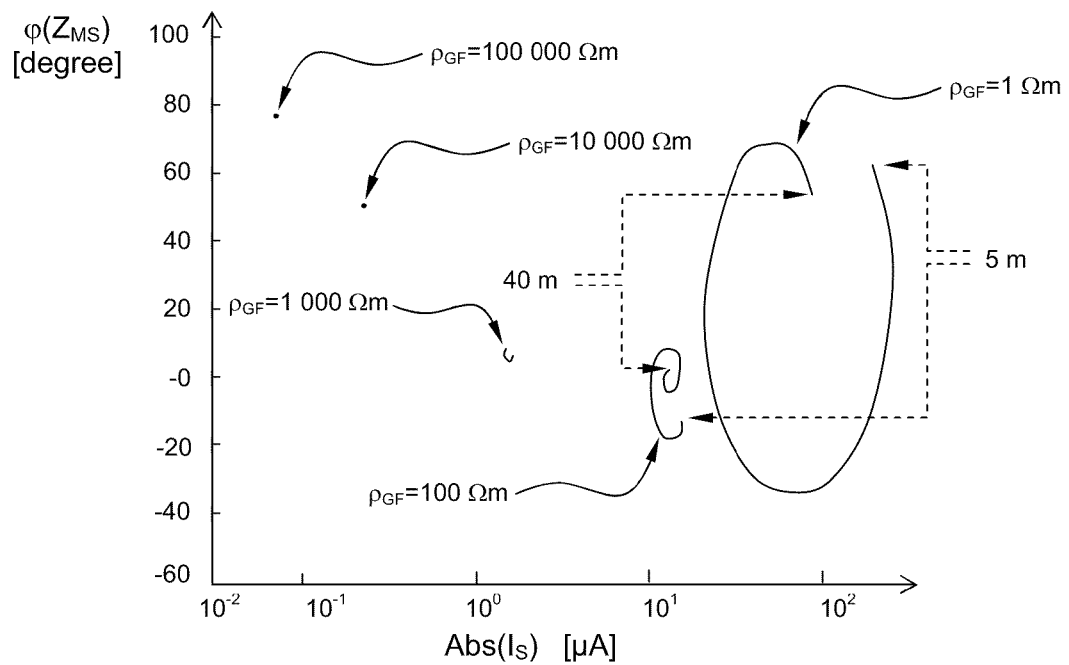
FIGS. 5 and 6 are graphics representing is the amplitude and phase of the survey current for various resistivities of geological formations and various position of the tool string touching the borehole wall for a tool according to the prior art and the invention, respectively.

FIG. 5 is a graphic representing various curves showing the amplitude and phase of the survey current $I_S$ for various resistivities of geological formations and various position of the tool string touching the borehole wall for a tool of the prior art. In particular, these curves show for various formation resistivities how the survey current changes if the tool string has a good electrical connection to the borehole wall between 5 m and 40 m (in FIG. 5—value close to a point) above the center of the pad. For resistivities below 1000 Ω·m the contact position affects the current. This is illustrated in the graph of FIG. 5 by the survey current describing spirals in the amplitude-phase plane as the coaxial wave-guide formed by the tool string, the mud and the geological formation is short-circuited further and further above the pad section. Such a behavior is typical when increasing the length of a non-characteristically terminated wave-guide.

Figure 6:
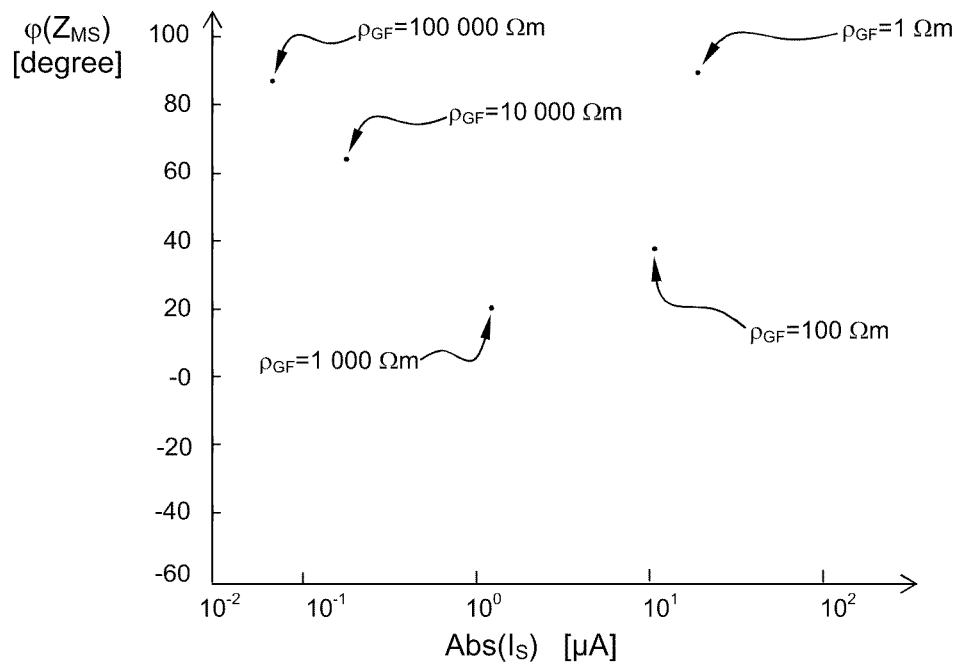

FIG. 6 is a graphic representing the amplitude and phase of the survey current $I_S$ for various resistivities of geological formations and various position of the tool string touching the borehole wall for a tool according to the invention. With the invention, both the current injection section and the current return section are electrically decoupled from the other sections of the tool string. Thus, the other sections of the tool string are not of the electrical circuit measuring the survey current. The characteristic impedance of the wave-guide formed by the tool string, the mud and the geological formation is of the order of 10Ω. Thus, an insulation section of medium-impedance, e.g. of the order 200Ω, at high frequency is sufficient to obtain a good electrical decoupling between the sections. FIG. 6 clearly shows that the spirals of FIG. 5 have completely disappeared. Consequently, the measurements of the survey current are no longer sensitive to the position where the tool string has the best electrical contact with the borehole wall.

FIG. 7A schematically illustrates a first embodiment of the isolation section ISS2 of the invention. FIG. 7B schematically illustrates the corresponding approximate equivalent circuit model. The isolation section is made of an insulator material. For example, the isolation section may be a coaxial ceramic insulator. The equivalent circuit is a capacitor $C_{insu}$ in parallel with a high leakage resistance $R_{insu}$. The impedance of the isolation section is given by:

$$Z_{ISS} = \frac{R_{insu}}{1 + j\omega R_{insu}C_{insu}} \approx \frac{1}{j\omega C_{insu}}$$

Typically, the resistance $R_{insu}$ is greater than 1 MΩ and the capacitor $C_{insu}$ is around 1 nF. At high frequency, the impedance of the isolation section is relatively low due to the large capacitive coupling.

FIGS. 8-10 schematically illustrate other embodiments of the isolation section. The impedance of the isolation section of these embodiments is increased either by adding a filter-type circuit with an inductive behavior, for example an inductance (FIGS. 8A and 8B), or an active circuit in parallel with the capacitor (FIGS. 9A, 9B and 10), or a combination of an inductance and an active circuit (not shown in the drawings). In these embodiments, the isolation section of increased impedance compensate for the capacitive coupling of the isolation section shown in FIG. 7.

FIGS. 8A and 8B schematically illustrate a second embodiment of the isolation section according to the invention, and a corresponding approximate equivalent circuit model, respectively. The impedance of a standard tool string insulation section is increased by adding an inductance $L_{insu}$ in parallel with the capacitor $C_{insu}$. The impedance of the isolation section is given by:

$$Z_{ISS} = \frac{\omega R_{insu}L_{insu}}{j\omega L_{insu} + R_{insu} - \omega^2 R_{insu}L_{insu}C_{insu}}$$

As an alternative, the inductance may be tuned for maximum effect at the frequency of operation. In this case, only the leakage resistance limits the impedance, and:

$$Z_{ISS} = R_{insu} \text{ for } L_{insu} = \frac{1}{\omega^2 C_{insu}}$$

FIGS. 9A and 9B schematically illustrate a third embodiment of the isolation section according to the invention, and a corresponding approximate equivalent circuit model, respectively. The impedance of a standard tool string insulation section is increased by adding an active circuit in parallel with the capacitor $C_{insu}$. The impedance of the active circuit is for example given by:

$$\frac{-R_{insu}}{1 + j\omega R_{insu}C_{insu}}, \text{ or } \frac{-1}{j\omega C_{insu}}$$

In order to compensate for the capacitive coupling, the leakage current through the capacitor $C_{insu}$ from the top section A to the bottom section B can be measured and a similar current can be injected from the bottom section B to the top section A. This is realized by an active circuit connected between the top section A and the bottom section B. The active circuit has a response which is the inverse of the response of the capacitor $C_{insu}$ in parallel with the resistance $R_{insu}$. Designing active circuit is well known in the art and will not be further described; reference is made to Horowitz and Hill, "The art of electronics", $2^{nd}$ edition, Cambridge University Press, "active inductor" pp. 304.

FIG. 10 schematically shows a fourth embodiment of the isolation section according to the invention. The fourth embodiment is an alternative to the second embodiment in which at least one guard screen C is positioned between the top section A and the bottom section B. More precisely, the screen is a conductive screen which is at least partially embedded into the insulator without contacting the adjacent top and bottom sections. The at least one guard screen C enables blocking the leakage current from the top section A to the bottom section B by a standard guarding technique which is based on the fact that there is theoretically no current running between two electrodes at the same potential. The active circuit of FIG. 9A is further connected to at least one guard screen C. Thus, either the top section A and the at least one guard screen C are kept at the same potential, blocking the leakage current between them, or the bottom section B and the at least one guard screen C are kept at the same potential, blocking the leakage current between them. Designing active circuit with guard screen is well known in the art and will not be further described; reference is made to Horowitz and Hill, "The art of electronics", $2^{nd}$ edition, Cambridge University Press, "signal guarding" pp. 465. Though only one guard screen is shown in FIG. 10, a person skilled in the art could easily design an insulation section with multiple guard screens.

FIG. 11 is a partial cross-section view in a borehole showing a part of a high-frequency current injection tool according to a first embodiment of the invention.

The string of tools TS comprises a high-frequency current injection tool 1 and one other section OS1. The high-frequency current injection tool comprises a current injection section CIS and a current return section CRS. The high-frequency current injection tool is positioned at the bottom of the string of tools TS. The other section OS1 is positioned adjacent to, more precisely on the top of the current return section CRS. The current return section CRS is positioned adjacent to, more precisely on the top of the current injection section CIS. The current injection section CIS is electrically decoupled from the current return section CRS by means of a first isolation section ISS1. The current return section CRS is electrically decoupled from the other section OS1 by means of a second isolation section ISS2. A current or voltage source SC is connected between the current injection section CIS and the current return section CRS. The current or voltage source SC applies a voltage drop between these sections. The current injection section comprises a pad 2 that is deployed by means of arm such that the pad 2 contacts the wall BW of the borehole BH. The pad 2 carries an electrode 3 for injecting a survey current $I_S$ into the geological formations GF.

FIG. 12 is a partial cross-section view in a borehole showing a part of a high-frequency current injection tool according to a second embodiment of the invention. The string of tools TS comprises a high-frequency current injection tool 1, a first other section OS1 and a second other section OS2. The high-frequency current injection tool comprises a current injection section CIS and a current return section CRS. The high-frequency current injection tool is positioned between the first OS1 and second OS2 other sections. The first other section OS1 is positioned adjacent to, more precisely on the top of the current return section CRS. The current return section CRS is positioned adjacent to, more precisely on the top of the current injection section CIS. The second other section OS2 is positioned adjacent to, more precisely on the bottom of the current injection section CIS. The current injection section CIS is electrically decoupled from the current return section CRS by means of a first isolation section ISS1. The current return section CRS is electrically decoupled from the first other section OS1 by means of a second isolation section ISS2. The current injection section CIS is electrically decoupled from the second other section OS2 by means of a third isolation section ISS3. The current or voltage source SC and the pad 2 are equivalent to the ones already described in relation with FIG. 11.

FIG. 13 is a partial cross-section view in a borehole showing a part of a high-frequency current injection tool according to a third embodiment of the invention. The third embodiment is based on the second embodiment and differs from the second one in that the current injection section CIS and the current return section CRS are inversed relatively to each other. More precisely, the current injection section CIS is positioned on the top of the current return section CRS. The current injection section CIS is electrically decoupled from the first other section OS1 by means of a second isolation section ISS2. The current return section CRS is electrically decoupled from the second other section OS2 by means of a third isolation section ISS3.

Figure 14:
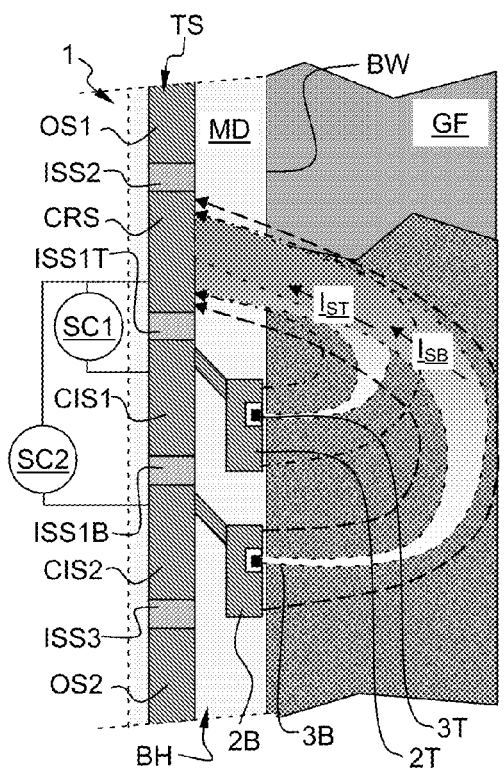

FIG. 14 is a partial cross-section view in a borehole showing a part of a high-frequency current injection tool according to a fourth embodiment of the invention. The string of tools TS comprises a high-frequency current injection tool 1, a first other section OS1 and a second other section OS2. The high-frequency current injection tool comprises a first current injection section CIS1, a second current injection section CIS2, and a current return section CRS. The high-frequency current injection tool is positioned between the first OS1 and second OS2 other sections. The first other section OS1 is positioned adjacent to, more precisely on the top of the current return section CRS. The first current return section CRS is positioned adjacent to, more precisely on the top of the first current injection section CIS1. The second current injection section CIS2 is positioned adjacent to, more precisely on the bottom of the first current injection section CIS1. The second other section OS2 is positioned adjacent to, more precisely on the bottom of the second current injection section CIS2. The first current injection section CIS1 is electrically decoupled from the current return section CRS by means of a first top isolation section ISS1T. The second current injection section CIS2 is electrically decoupled from the first current injection section CIS1 by means of a first bottom isolation section ISS1B. The current return section CRS is electrically decoupled from the first other section OS1 by means of a second isolation section ISS2. The second current injection section CIS2 is electrically decoupled from the second other section OS2 by means of a third isolation section ISS3. A first current or voltage source SC1 is connected between the first current injection section CIS1 and the current return section CRS. A second current or voltage source SC2 is connected between the second current injection section CIS2 and the current return section CRS. The first current injection section CIS1 comprises a top pad 2T that is deployed by means of arm such that the pad 2T contacts the wall BW of the borehole BH. The pad 2T carries an electrode 3T for injecting a top survey current $I_{ST}$ into the geological formations GF. The second current injection section CIS2 comprises a bottom pad 2B that is deployed by means of arm such that the pad 2B contacts the wall BW of the borehole BH. The pad 2B carries an electrode 3B for injecting a bottom survey current $I_{SB}$ into the geological formations GF. The first SC1 and second SC2 current or voltage source SC2 may operate at slightly different frequencies in order to prevent interference between both survey current measurements. This embodiment enables that the two current injection section share a single current return section.

Figure 15:
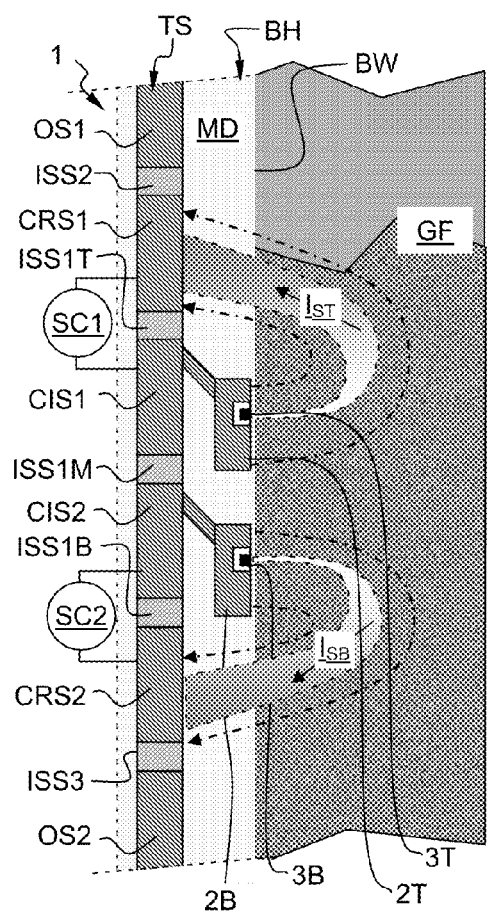

FIG. 15 is a partial cross-section view in a borehole showing a part of a high-frequency current injection tool according to a fifth embodiment of the invention. The string of tools TS comprises a high-frequency current injection tool 1, a first other section OS1 and a second other section OS2. The high-frequency current injection tool comprises a first current injection section CIS1, a first current return section CRS1, a second current injection section CIS2, and a second current return section CRS2. The high-frequency current injection tool is positioned between the first OS1 and second OS2 other sections. The first other section OS1 is positioned adjacent to, more precisely on the top of the first current return section CRS1. The first current return section CRS1 is positioned adjacent to, more precisely on the top of the first current injection section CIS1. The second current injection section CIS2 is positioned adjacent to, more precisely on the bottom of the first current injection section CIS1. The second current return section CRS2 is positioned adjacent to, more precisely on the bottom of the second current injection section CIS2. The second other section OS2 is positioned adjacent to, more precisely on the bottom of the second current return section CRS2. The first current injection section CIS1 is electrically decoupled from the first current return section CRS1 by means of a first top isolation section ISS1T. The second current injection section CIS2 is electrically decoupled from the first current injection section CIS1 by means of a first middle isolation section ISS1M. The second current injection section CIS2 is electrically decoupled from the second current return section CRS2 by means of a first bottom isolation section ISS1B. The first current return section CRS1 is electrically decoupled from the first other section OS1 by means of a second isolation section ISS2. The second current return section CRS2 is electrically decoupled from the second other section OS2 by means of a third isolation section ISS3. A first current or voltage source SC1 is connected between the first current injection section CIS1 and the first current return section CRS1. A second current or voltage source SC2 is connected between the second current injection section CIS2 and the second current return section CRS2. The first current injection section CIS1 comprises a top pad 2T that is deployed by means of arm such that the pad 2T contacts the wall BW of the borehole BH. The pad 2T carries an electrode 3T for injecting a top survey current $I_{ST}$ into the geological formations GF. The second current injection section CIS2 comprises a bottom pad 2B that is deployed by means of arm such that the pad 2B contacts the wall BW of the borehole BH. The pad 2B carries an electrode 3B for injecting a bottom survey current $I_{SB}$ into the geological formations GF. The first SC1 and second SC2 current or voltage source SC2 may operate at slightly different frequencies in order to prevent interference between both survey current measurements.

FIG. 16 is a partial cross-section view in a borehole showing a part of a high-frequency current injection tool according to a sixth embodiment of the invention.

The sixth embodiment is based on the fifth embodiment and differs from the fifth one in that the first current injection section CIS1 and the second current injection section CIS2 are regrouped into a common current injection section CISC. The first middle isolation section ISS1M is replaced by a current measurement device CMD. The current measurement device CMD measures the current flowing in the common current injection section. More precisely, the current measurement device CMD measures the current flowing between the top pad 2T and the bottom pad 2B. This embodiment enables saving one isolation section.

A linear combination of a measurement where all the current of both sets of pads returns to the first return current section CRS 1 and a measurement where all the currents of both sets of pads returns to the second return current section CRS2 may be implemented. Based on the measured current flowing in the common current injection section this combination can be chosen such that effectively there is no current running between the two sets of pads. This technique can be hardware implemented as an adaptive system. This technique may alternatively be performed as a processing step.

Alternatively, the first SC1 and second SC2 current or voltage source may operate at slightly different frequencies. The top survey current $I_{ST}$ and bottom survey current $I_{SB}$ can be measured at the same time. A linear combination of both measurements may also be used in this alternative.

FIGS. 17 to 21 relates to embodiment of the invention in which the current return section is positioned closer to the formation, enabling a better coupling with the geological formation.

FIG. 17 is a partial cross-section view in a borehole showing a part of a high-frequency current injection tool according to a seventh embodiment of the invention. The seventh embodiment is based on the second or fourth embodiment and differs from these one in that the current return section is an extended current section CRSE. The extended current section CRSE has a diameter greater than the diameter of the tool string such that it radially protrudes towards the wall of the borehole. The extended current section may have the form of a thick conductive sleeve.

Figure 18:
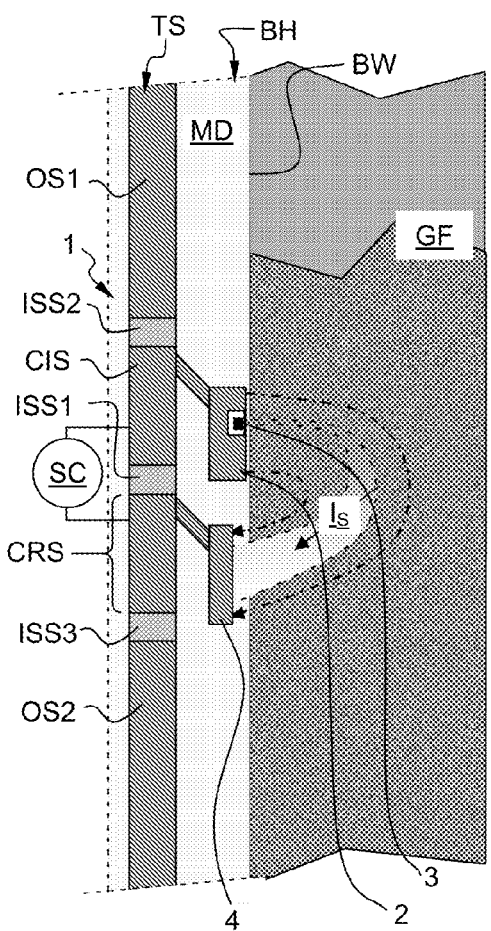

FIG. 18 is a partial cross-section view in a borehole showing a part of a high-frequency current injection tool according to an eighth embodiment of the invention. The eighth embodiment is based on the second or fourth embodiment and differs from these one in that the current return section comprises an extendable element 4. The extendable element 4 is a conductive element that may be extended towards the wall of the borehole. This embodiment is advantageous because it enables operating even if the tool string has to be run in different borehole diameters.

Figure 19:
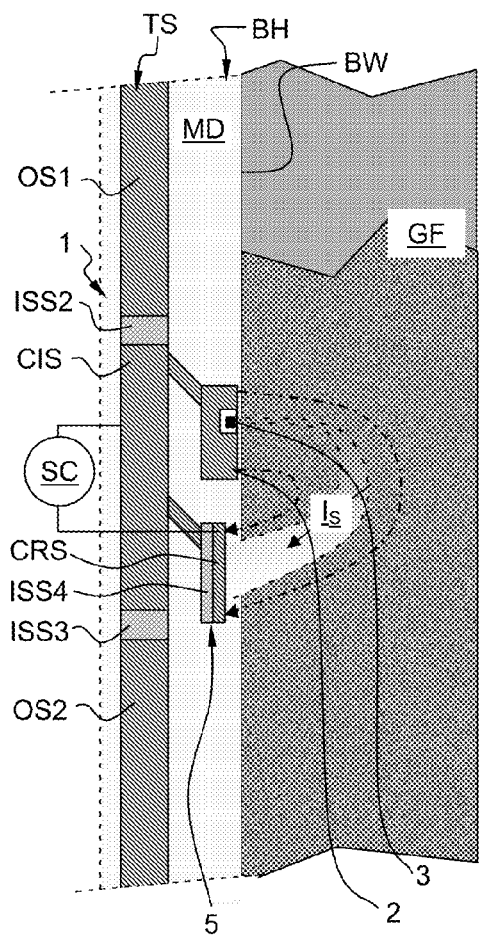

FIG. 19 is a partial cross-section view in a borehole showing a part of a high-frequency current injection tool according to a ninth embodiment of the invention. The ninth embodiment is based on the eighth embodiment and differs from it in that the current return section comprises an isolated extendable element 5. The current injection section CIS and the current return section CRS of the eighth embodiment are regrouped to form a current injection section CIS of greater length. The extendable element 5 comprises a front side that faces the borehole wall BW and a back side that faces the tool string TS. The extendable element 5, more precisely the front side of the extendable element constitutes the former current return section CRS. The back side of the extendable element constitutes an isolation section ISS4. The current or voltage source SC is connected between the current injection section and the front side of the extendable element 5. The extendable element may be extended towards the wall of the borehole.

Figure 20:
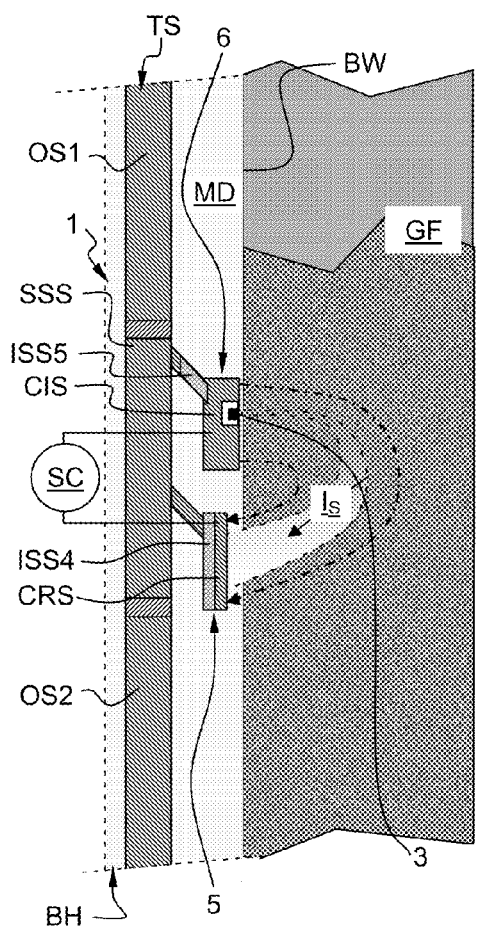

FIG. 20 is a partial cross-section view in a borehole showing a part of a high-frequency current injection tool according to a tenth embodiment of the invention. The high-frequency current injection tool 1 comprises a supporting section SSS. The supporting section comprises an extendable element 5 and a pad 6. The supporting section SSS, the first other section OS1 and the second other section OS2 form, from the electrical point of view, one and the same entity. The extendable element 5 comprises a front side that faces the borehole wall BW and a back side that faces the tool string TS. The extendable element 5, more precisely the front side of the extendable element constitutes the former current return section CRS. The back side of the extendable element constitutes a first isolation section ISS4. The pad 6, more precisely the front side of the pad constitutes the former current injection section CIS. The arm of the pad constitutes a second isolation section ISS5. Alternatively, the back side of the pad may constitute the second isolation section ISS5. Both isolation sections electrically decouple the extendable element 5 and the pad 6 from the supporting section SSS. A current or voltage source is connected between the current injection section CIS and the current return section CRS. Other sections of the tool string OS1, OS2 may be coupled on the top and/or on the bottom of the supporting section SSS.

Figure 21:
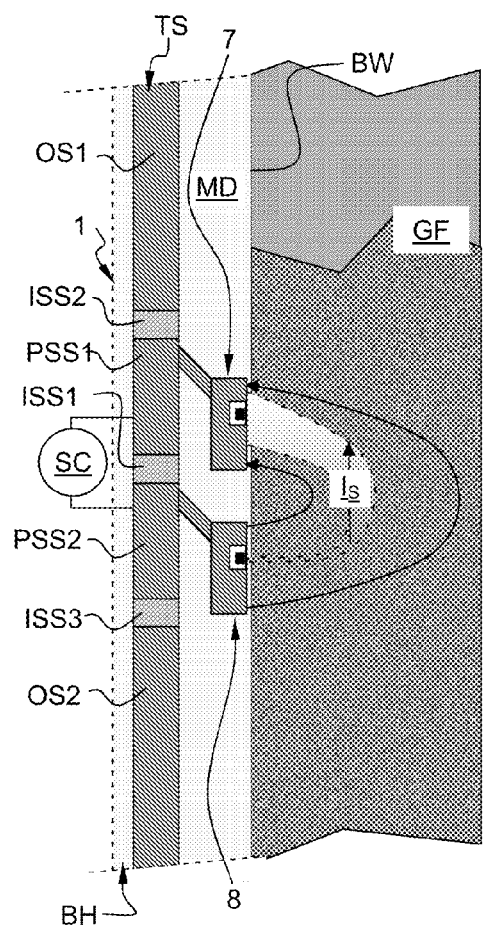

FIG. 21 is a partial cross-section view in a borehole showing a part of a high-frequency current injection tool according to an eleventh embodiment of the invention.

The string of tools TS comprises a high-frequency current injection tool 1, a first other section OS1 and a second other section OS2. The high-frequency current injection tool comprises a first pad supporting section PSS1 and a second pad supporting section PSS2. The high-frequency current injection tool is positioned between the first OS1 and second OS2 other sections. The first other section OS1 is positioned adjacent to, more precisely on the top of the first pad supporting section PSS1. The first pad supporting section PSS1 is positioned adjacent to, more precisely on the top of the second pad supporting section PSS2. The second other section OS2 is positioned adjacent to, more precisely on the bottom of the second pad supporting section PSS2. The first pad supporting section PSS1 is electrically decoupled from the second pad supporting section PSS2 by means of a first isolation section ISS1. The first pad supporting section PSS1 is electrically decoupled from the first other section OS1 by means of a second isolation section ISS2. The second pad supporting section PSS2 is electrically decoupled from the second other section OS2 by means of a third isolation section ISS3. The first pad supporting section PSS1 comprises a first pad 7 that may be deployed against the borehole wall. The second pad supporting section PSS2 comprises a second pad 8 that may be deployed against the borehole wall. A current or voltage source SC is connected between the first pad supporting section PSS1 and the second pad supporting section PSS2. The current or voltage source SC and the pads are equivalent to the ones already described in relation with FIG. 11. In this embodiment, the first and second pads act as current injection section. The first and second pads act also as current return section for each other. It will be apparent for a person skilled in the art that this embodiment is not limited to two pads as more sets of pads may act as the current return section(s) for one or more other sets of pads. It is to be noted that, for sake of clarity, only the survey current $I_S$ flowing from the second pad 8 in direction to the first pad 7 is shown in FIG. 21.

FIGS. 22, 23, 24 and 25 relate to embodiments of the invention which differ from the hereinbefore described embodiments in that the current injection section and the current return section are both comprised in a unique extended pad. Advantageously, these embodiments enable a smaller distance between the current injection section and the current return section than the other embodiments. Thus, the measurements can be made at a higher frequency without being affected by electromagnetic propagation effects such as skin depth in the geological formations.

In all the embodiments that will be described hereinafter, the high-frequency current injection tool 1 comprises a supporting section SSS. The supporting section comprises an extended pad 9, 10, 11, 12 that can be deployed to come in contact with the bore wall BW. The supporting section SSS, the first other section OS1 and the second other section OS2 form, from the electrical point of view, one and the same entity. A current or voltage source is connected between the current injection section CIS and the current return section CRS. Other sections of the tool string OS1, OS2 may be coupled on the top and/or on the bottom of the supporting section SSS.

Figure 22:
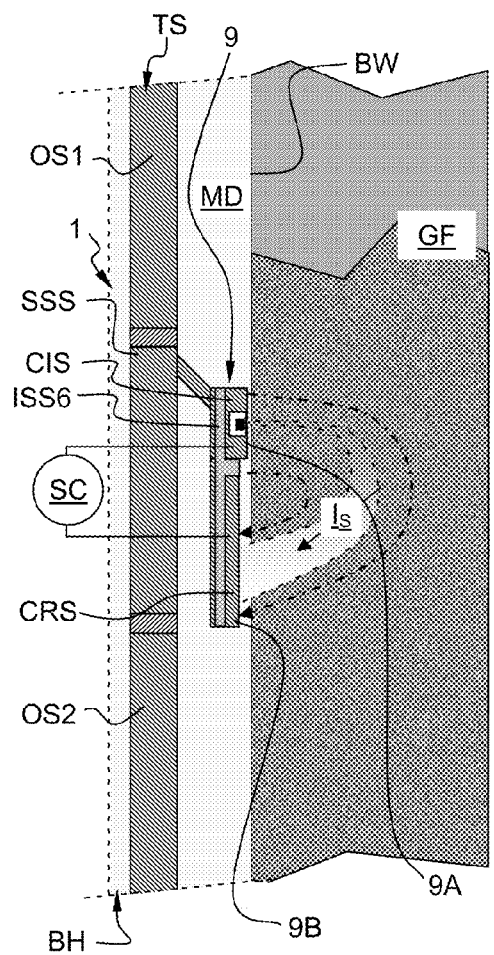

FIG. 22 is a partial cross-section view in a borehole showing a part of a high-frequency current injection tool according to a twelve embodiment of the invention. The extended pad 9 comprises a front side that faces the borehole wall BW and a back side that faces the tool string TS. The extended pad 9, more precisely the front side of the extendable element comprises a first part 9A and a second part 9B. The first part 9A constitutes the former current injection section CIS. The second part 9B constitutes the former current return section CRS. The first part 9A is isolated from the second part 9B by means of an isolation section ISS6. Further, this isolation section ISS6 also isolates the first 9A and second 9B part from the supporting section SSS. The isolation section ISS6 is comprised in a back side of the extended pad 9.

Figure 23:
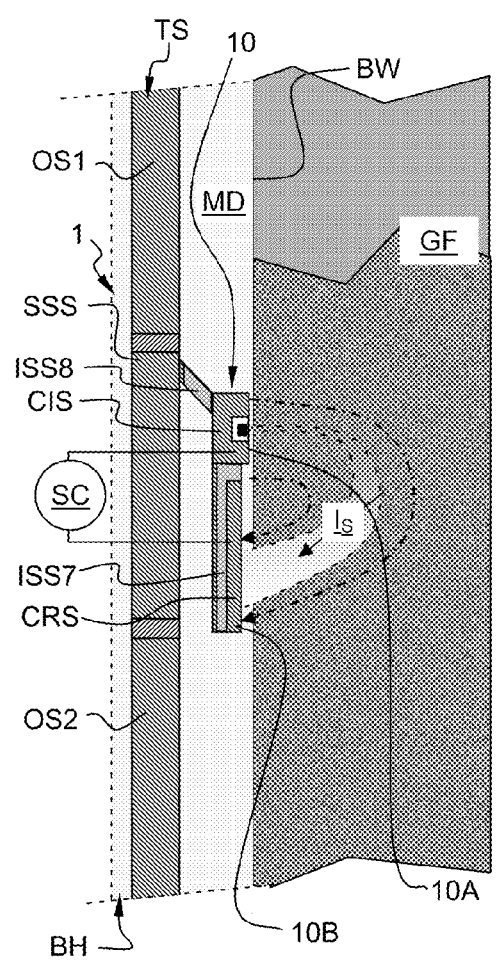

FIG. 23 is a partial cross-section view in a borehole showing a part of a high-frequency current injection tool according to a thirteen embodiment of the invention. The thirteen embodiment is based on the twelve embodiment and differs from it in that it comprises a first ISS7 and a second ISS8 isolation section, the extended pad being isolated from the supporting section SSS by means of the arm coupling the extended pad to the supporting section.

The extended pad 10 comprises a front side that faces the borehole wall BW and a back side that faces the tool string TS. The extended pad 10, more precisely the front side of the extendable element comprises a first part 10A and a second part 10B. The first part 10A constitutes the former current injection section CIS. The second part 10B constitutes the former current return section CRS. The second part 10B is isolated from the first part 10A by means of a first isolation section ISS7. The first isolation section ISS7 encompasses the current return section CRS. The extended pad 10 is isolated from the supporting section SSS by means of the arm of the extended pad 10 which comprises a second isolation section ISS8. Thus, the second isolation section ISS8 also isolates the first part 10A from the supporting section SSS.

Figure 24:
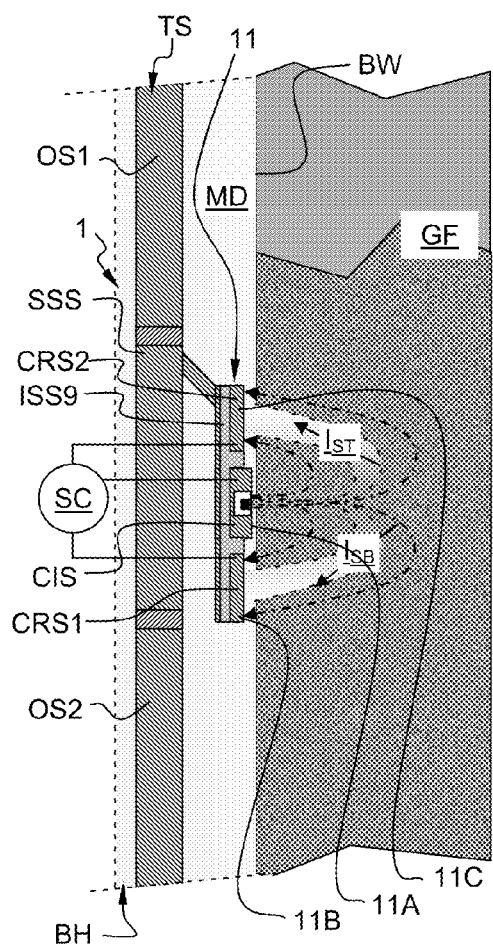

FIG. 24 is a partial cross-section view in a borehole showing a part of a high-frequency current injection tool according to a fourteenth embodiment of the invention. The extended pad 11 comprises a front side that faces the borehole wall BW and a back side that faces the tool string TS. The extended pad 11, more precisely the front side of the extendable element comprises a middle part 11A, a bottom part 11B and a top part 11C. The middle part 11A constitutes the former current injection section CIS. The bottom 11B and top 11C part constitutes a first CRS1 and second CRS2 current return section, respectively. The top part 11C is positioned above the middle part 11A. The bottom part 11B is positioned below the middle part 11A. The middle part 11A, the bottom part 11B and the top part 11C are isolated from each other by means of an isolation section ISS9. Further, this isolation section ISS9 also isolates the middle, bottom and top parts from the supporting section SSS. The isolation section ISS9 is comprised in a back side of the extended pad 11. The current or voltage source is connected to the current injection section CIS, the first current return section CRS1 and the second current return section CRS2.

Figure 25:
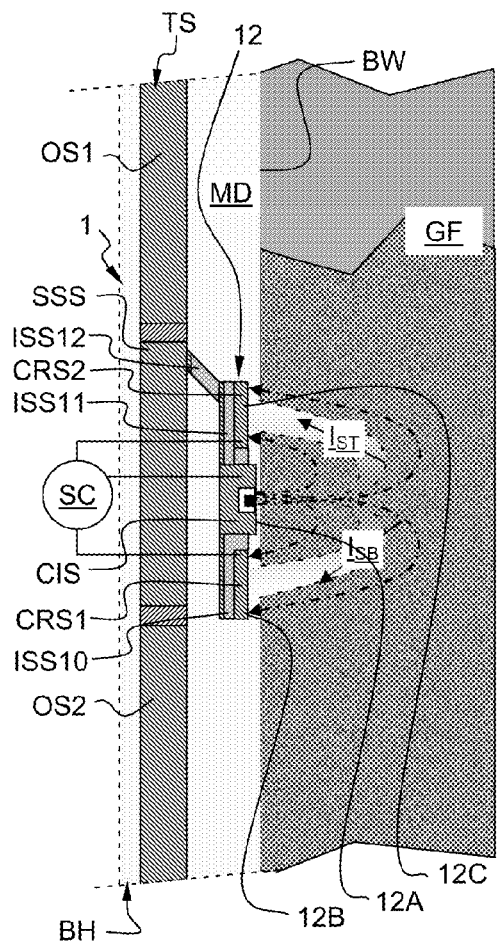

FIG. 25 is a partial cross-section view in a borehole showing a part of a high-frequency current injection tool according to a fifteen embodiment of the invention. The fifteen embodiment is based on the fourteen embodiment and differs from it in that it comprises a first ISS10, a second ISS11 and a third ISS12 isolation section, the extended pad being isolated from the supporting section SSS by means of the arm coupling the extended pad to the supporting section.

The extended pad 12 comprises a front side that faces the borehole wall BW and a back side that faces the tool string TS. The extended pad 12, more precisely the front side of the extendable element comprises a middle part 12A, a bottom part 12B and a top part 12C. The middle part 12A constitutes the former current injection section CIS. The bottom 12B and top 12C part constitutes the first CRS1 and second CRS2 current return section, respectively. The bottom part 12B is isolated from the middle part 12A and the top part 12C by means of a first isolation section ISS10. The first isolation section ISS10 encompasses the first current return section CRS1. The top part 12C is isolated from the middle part 12A and the bottom part 12C by means of a second isolation section ISS11. The second isolation section ISS11 encompasses the second current return section CRS2. The extended pad 12 is isolated from the supporting section SSS by means of the arm of the extended pad 12 which comprises a third isolation section ISS12. Thus, the third isolation section ISS12 also isolates the middle part 12A from the supporting section SSS.

Final Remarks

A particular application of the invention relating to a wireline tool has been described. However, it is apparent for a person skilled in the art that the invention is also applicable to a logging-while-drilling tool. A typical logging-while-drilling tool is incorporated into a bottom-hole assembly attached to the end of a drill string with a drill bit attached at the extreme end thereof. Measurements can be made either when the drill string is stationary or rotating. In the latter case an additional measurement is made to allow the measurements to be related to the rotational position of the drill string in the borehole. This is preferably done by making simultaneous measurements of the direction of the earth's magnetic field with a compass, which can be related to a reference measurement made when the drill string is stationary.

It will also be apparent for a person skilled in the art that the invention is applicable to onshore and offshore hydrocarbon well location.

It is apparent that the term "pad" used hereinbefore generically indicates a contacting element with the surface of the borehole wall. The particular contacting element shown in the Figures for maintaining the electrode in engagement with the borehole wall is illustrative and it will be apparent for a person skilled in the art that other suitable contacting element may be implemented, for example a sonde with a backup arm, a centralizer, etc. . . .

Finally, it is also apparent for a person skilled in the art that application of the invention to the oilfield industry is not limited as the invention can also be used in others types of geological surveys.

The drawings and their description hereinbefore illustrate rather than limit the invention.

Any reference sign in a claim should not be construed as limiting the claim. The word "comprising" does not exclude the presence of other elements than those listed in a claim.

The word "a" or "an" preceding an element does not exclude the presence of a plurality of such element.

The invention claimed is:

1. A tool used in electrical investigation of geological formations surrounding a borehole, the tool being comprised in a string of tools, the tool comprising a current injection section and a current return section, the string of tools comprising at least one other section, wherein
   the current injection section is electrically decoupled from the current return section,
   the current injection section is electrically decoupled from the at least one other section when the current injection section and the at least one other section are adjacent to each other, and
   the current return section is electrically decoupled from the at least one other section when the current return section and the at least one other section are adjacent to each other.

2. The tool according to claim 1, wherein the current injection section injects current into the geological formations surrounding the borehole at a frequency above around 100 kHz.

3. The tool according to claim 1, wherein a current or voltage source is connected between the current injection section and the current return section.

4. The tool according to claim 1, wherein the current injection section comprises at least one pad for contacting a wall of the borehole, the pad carrying at least one electrode for injecting current into the geological formations.

5. The tool according to claim 4, wherein the tool comprises a supporting section for supporting the pad, and wherein the pad constitutes the current injection section, the pad being isolated from the supporting section.

6. The tool according to claim 1, wherein the current return section is an extended current section radially protruding towards the wall of the borehole relatively to the other sections.

7. The tool according to claim 1, wherein the current return section comprises an extendable element able to be extended towards the wall of the borehole.

8. The tool according to claim 7, wherein the tool comprises a supporting section for supporting the extendable element, and wherein the extendable element constitutes the current return section and is isolated from the supporting section.

9. The tool according to claim 1, wherein the current return section comprises at least one pad for contacting a wall of the borehole, the pad carrying at least one electrode for sensing current.

10. The tool according to claim 1, wherein the current injection section comprises a first pad and a second pad, the first pad being associated with a first current return section, the second pad being associated with a second current return section, and wherein the current injection section further comprises a current measurement device for measuring the current flowing in the current injection section between the two pads.

11. The tool according claim 1, wherein the tool comprises a supporting section supporting an extended pad, and wherein the extended pad comprises a first part constituting the current injection section and a second part constituting the current return section, the first part being isolated from the second part and from the supporting section.

12. The tool according to claim 11, wherein the first part is isolated from the supporting section by means of an arm of the extended pad.

13. The tool according to claim 1, wherein the tool comprises a supporting section supporting an extended pad, and wherein the extended pad comprises a middle part constituting the current injection section, a bottom part constituting a first current return section and a top part constituting a second current return section, the top part being positioned above the middle part and the bottom part being positioned below the middle part, the middle, top and bottom parts being isolated from each other and from the supporting section.

14. The tool according to claim 13, wherein the middle part is isolated from the supporting section by means of an arm of the extended pad.

15. The tool according to claim 1, wherein the sections are electrically decoupled from each other by an isolation section.

16. The tool according to claim 15, wherein the isolation section comprises an insulator.

17. The tool according to claim 15, wherein the isolation section comprises an insulator and a capacitive coupling compensation circuit coupled in parallel to the insulator.

18. The tool according to claim 17, wherein the capacitive coupling compensation circuit is an inductance.

19. The tool according to claim 17, wherein the capacitive coupling compensation circuit is an active circuit.

20. The tool according to claim 19, wherein at least one conductive screen is further at least partially embedded into the insulator without contacting the adjacent section, and wherein the active circuit is further connected to the at least one screen.

* * * * *